US012559331B2

(12) United States Patent
Takahashi et al.

(10) Patent No.: US 12,559,331 B2
(45) Date of Patent: Feb. 24, 2026

(54) RECORDING APPARATUS

(71) Applicant: CANON KABUSHIKI KAISHA, Tokyo (JP)

(72) Inventors: Sho Takahashi, Kanagawa (JP); Masashi Ito, Tokyo (JP); Motoyuki Taguchi, Tokyo (JP); Keisuke Arita, Tokyo (JP); Kento Tamari, Saitama (JP); Ryota Komatsu, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 192 days.

(21) Appl. No.: 18/506,789

(22) Filed: Nov. 10, 2023

(65) Prior Publication Data

US 2024/0158192 A1 May 16, 2024

(30) Foreign Application Priority Data

Nov. 15, 2022 (JP) ................................ 2022-182933

(51) Int. Cl.

*B65H 5/06* (2006.01)
*B41J 13/00* (2006.01)
*B41J 13/03* (2006.01)

(52) U.S. Cl.

CPC ............ *B65H 5/06* (2013.01); *B41J 13/0009* (2013.01); *B41J 13/03* (2013.01); *B65H 2301/3423* (2013.01); *B65H 2701/1311* (2013.01)

(58) Field of Classification Search

CPC .......... B65H 5/06; B65H 29/58; B65H 85/00; B65H 2801/06; B65H 2801/15; B65H 2701/1311; B65H 2301/1511; B65H 2301/33312; B65H 2301/3423; B41J 13/0009; B41J 13/03; B41J 3/60

USPC ................................ 271/184, 285, 286, 301

See application file for complete search history.

(56) References Cited

U.S. PATENT DOCUMENTS

| | | | | |
|---|---|---|---|---|
| 8,277,016 | B2 * | 10/2012 | Moriyama | B41J 13/0009 347/101 |
| 10,005,293 | B2 * | 6/2018 | Nishida | B65H 5/24 |
| 10,447,875 | B2 * | 10/2019 | Suzuki | B65H 7/02 |
| 10,513,407 | B2 * | 12/2019 | Nishida | B65H 5/36 |
| 11,128,773 | B2 * | 9/2021 | Suzuki | B65H 9/004 |

(Continued)

FOREIGN PATENT DOCUMENTS

JP 2014043338 A 3/2014

*Primary Examiner* — Leslie A Nicholson, III

(74) *Attorney, Agent, or Firm* — Canon U.S.A., Inc., IP Division

(57) ABSTRACT

A recording apparatus includes a feed roller, a conveyance roller, a recording unit, a reverse path, and a control unit. The conveyance roller conveys a sheet fed by the feed roller. The recording unit performs recording on the conveyed sheet. The reverse path reverses, in the reverse path, a traveling direction of the sheet on which the recording is performed. The control unit performs control so that a leading edge of a second sheet overlaps a first sheet on which recording is being performed by the recording unit. Recording on the second sheet is to be performed by the recording unit following the recording on the first sheet. The control unit performs control to reverse the traveling direction of the first sheet and the traveling direction of the second sheet in the reverse path while maintaining an overlapping state of the first sheet and the second sheet.

16 Claims, 13 Drawing Sheets

(56) References Cited

U.S. PATENT DOCUMENTS

| | | | | |
|---|---|---|---|---|
| 11,396,435 | B2 * | 7/2022 | Taniguchi ................ | B65H 7/02 |
| 2020/0024092 | A1 * | 1/2020 | Taniguchi .............. | B65H 85/00 |

* cited by examiner

FIG.4

| FEED ORDER | RE-FEED ORDER | FEED SOURCE | RECORDING ORDER | FRONT/BACK | POST-RECORDING PROCESSING |
|---|---|---|---|---|---|
| P1 | | STACKING PORTION | 1 | BACK (SECOND SIDE) | REVERSING |
| P2 | | STACKING PORTION | 2 | BACK (SECOND SIDE) | REVERSING |
| P3 | | STACKING PORTION | 3 | BACK (SECOND SIDE) | REVERSING |
| P4 | | STACKING PORTION | 4 | BACK (SECOND SIDE) | REVERSING |
| | P2 | REVERSE PATH | 5 | FRONT (FIRST SIDE) | DISCHARGING |
| | P1 | REVERSE PATH | 6 | FRONT (FIRST SIDE) | DISCHARGING |
| | P4 | REVERSE PATH | 7 | FRONT (FIRST SIDE) | DISCHARGING |
| | P3 | REVERSE PATH | 8 | FRONT (FIRST SIDE) | DISCHARGING |

FIG.13
ST16
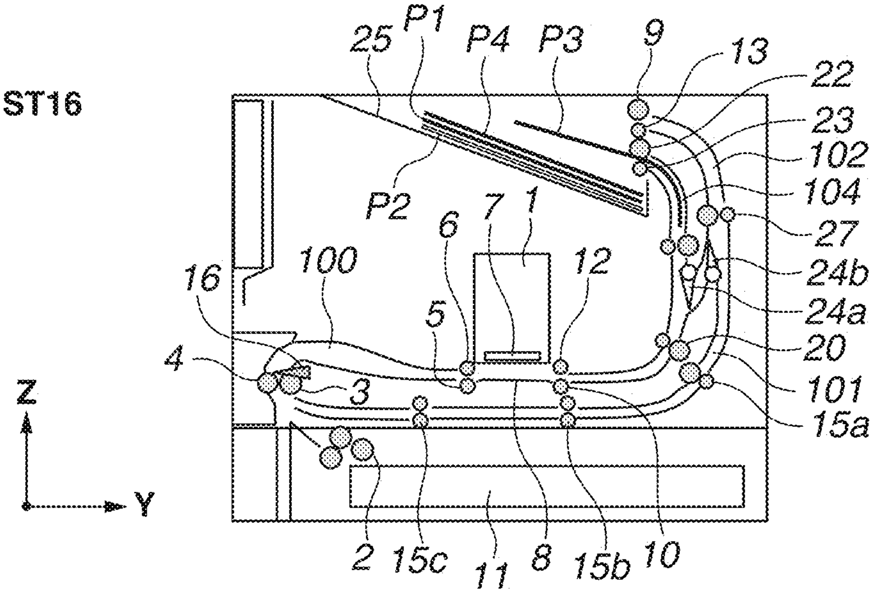
ST17
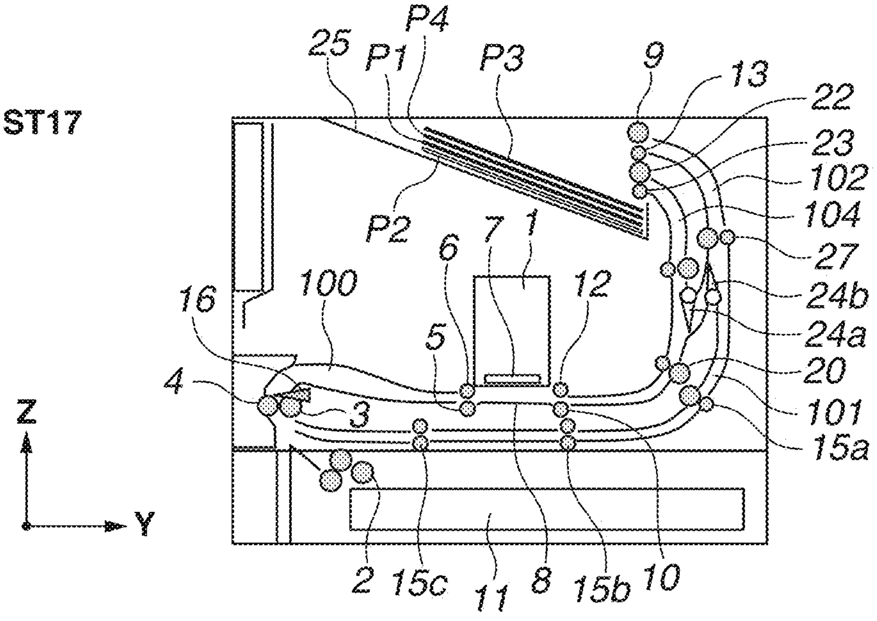

RECORDING APPARATUS

BACKGROUND

Field

The present disclosure relates to a recording apparatus capable of performing double-sided recording on sheets.

Description of the Related Art

Japanese Patent Application Laid-Open No. 2014-043338 discusses a recording apparatus that records images on both sides of a sheet by reversing a traveling direction of the sheet in a reverse path after a transfer unit transfers the image to one side of the sheet. In a case where a plurality of sheets is conveyed from the reverse path to the transfer unit, the recording apparatus can convey the preceding sheet and the subsequent sheet fed following the preceding sheet in opposite directions in the reverse path so that the preceding sheet and the subsequent sheet pass by each other. This makes it possible to perform double-sided recording on the plurality of sheets continuously and efficiently without increasing a conveyance path.

In the recording apparatus discussed in Japanese Patent Application Laid-Open No. 2014-043338, the preceding sheet and the subsequent sheet, which are away from each other in the conveyance direction, pass by each other in the reverse path. Thus, it takes time to convey the sheets through the reverse path, and this may lead to a decrease in productivity.

SUMMARY

The present disclosure is directed to a recording apparatus that improves productivity in double-sided recording on a plurality of sheets.

According to an aspect of the present disclosure, a recording apparatus includes a feed roller configured to feed a sheet, a conveyance roller configured to convey the sheet fed by the feed roller, a recording unit configured to perform recording on the sheet conveyed by the conveyance roller, a reverse path configured to reverse, in the reverse path, a traveling direction of the sheet on which the recording is performed by the recording unit, and a control unit configured to perform control so that a leading edge of a second sheet overlaps a first sheet on which recording is being performed by the recording unit, wherein recording on the second sheet is to be performed by the recording unit following the recording on the first sheet, and wherein the control unit performs control to reverse the traveling direction of the first sheet and the traveling direction of the second sheet in the reverse path while maintaining an overlapping state of the first sheet and the second sheet.

Further features of the present disclosure will become apparent from the following description of exemplary embodiments with reference to the attached drawings.

BRIEF DESCRIPTION OF THE DRAWINGS

FIG. 4 is a table illustrating orders in a case where recording is performed continuously on sheets P1 to P4.

FIG. 13 is a view illustrating how the sheets P1 to P4 are discharged.

DESCRIPTION OF THE EMBODIMENTS

An exemplary embodiment of the present disclosure will be described below with reference to the drawings. Dimensions, materials, shapes, and relative arrangements of components according to the exemplary embodiment described below can be changed as appropriate based on a configuration of an apparatus to which the exemplary embodiment is applied or based on various conditions and are not intended to limit the scope of the present disclosure to the exemplary embodiment described below.

<Recording Apparatus>

Figure 1A:
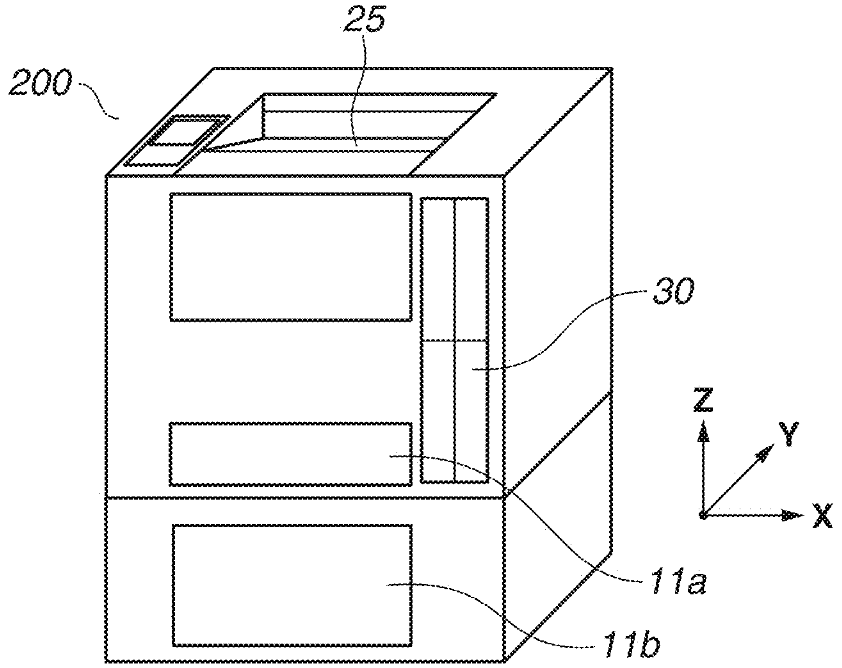
FIGS. 1A and 1B are views illustrating a main portion of a recording apparatus.
Figure 1B:
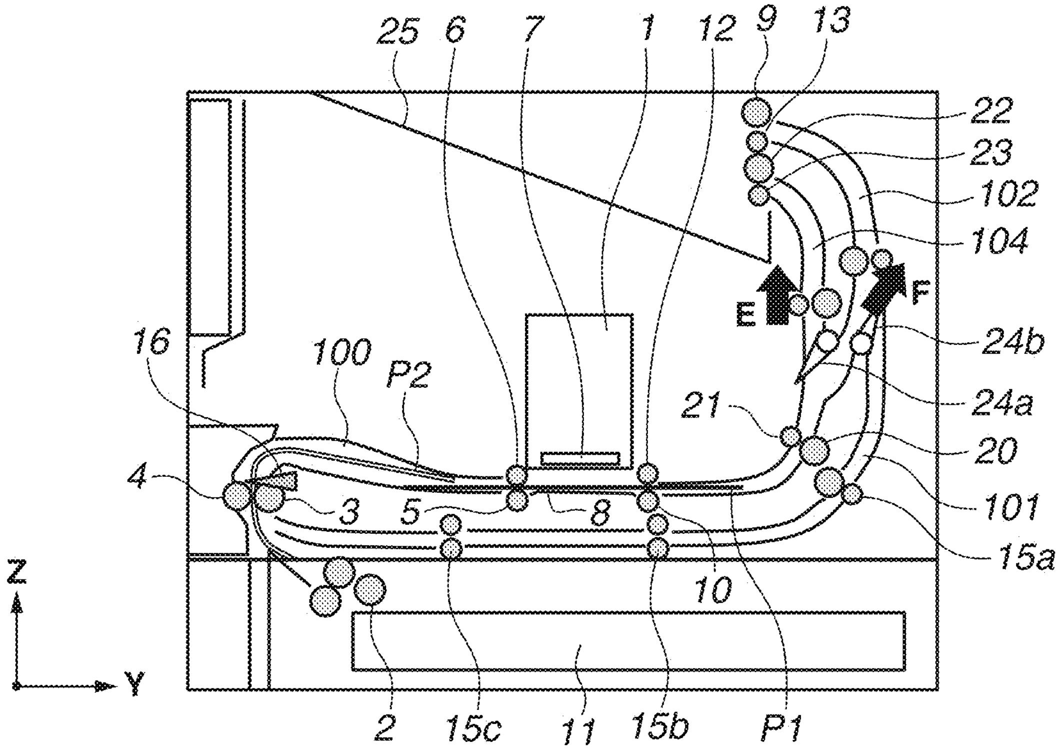
Figure 2A:
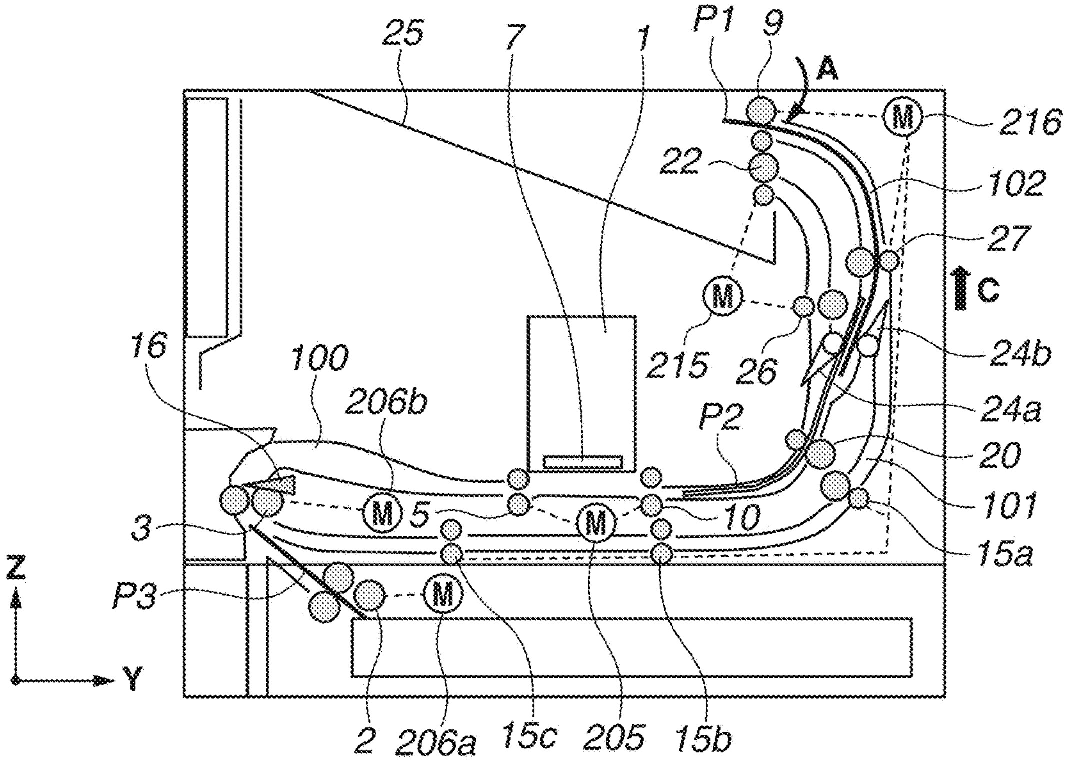
FIGS. 2A and 2B are cross-sectional views illustrating an arrangement of motors and sensors on conveyance paths of the recording apparatus.
Figure 2B:
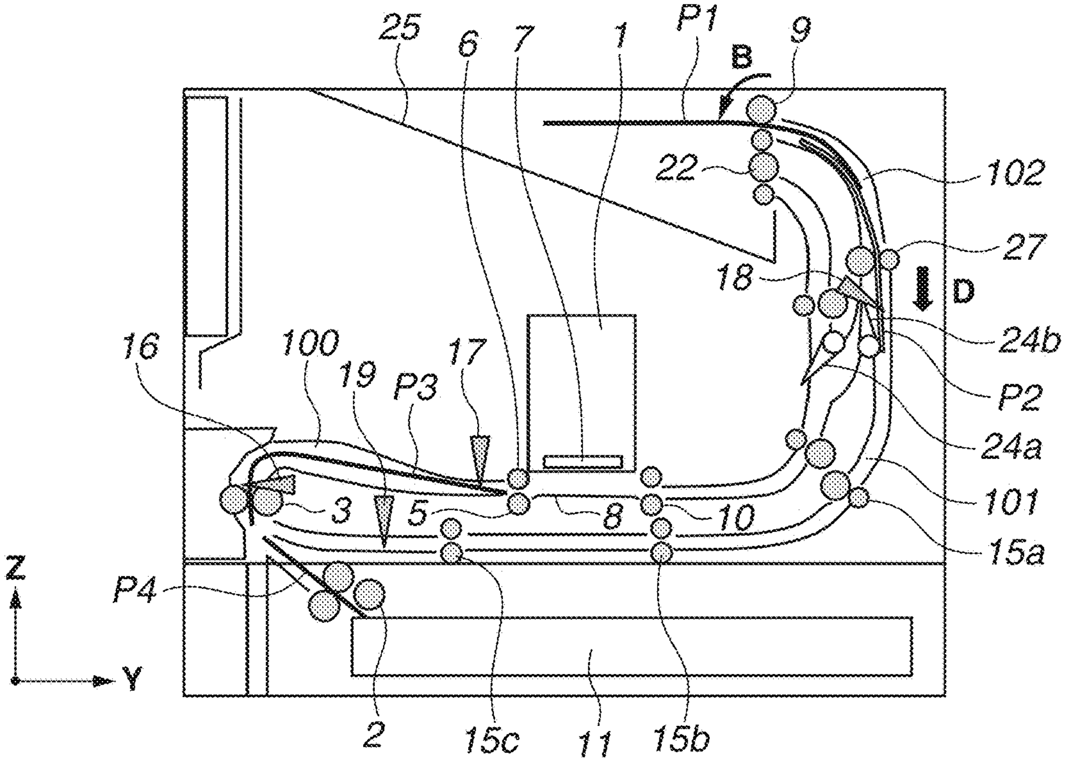

A recording apparatus 200 according to an exemplary embodiment of the present disclosure will be described below with reference to FIGS. 1A, 1B, 2A, and 2B. FIGS. 1A and 1B illustrate a main portion of the recording apparatus 200. FIGS. 2A and 2B are cross-sectional views illustrating an arrangement of motors and sensors on conveyance paths. The recording apparatus 200 has a cuboidal shape as illustrated in FIG. 1A.

The recording apparatus 200 uses a serial-type inkjet method of recording images on sheets P by ejecting ink supplied from an ink tank 30 onto the sheets P. The present exemplary embodiment is also applicable to line head-type inkjet recording apparatuses and electrophotographic recording apparatuses. The term "recording" encompasses not only cases of forming meaningful information, such as text and graphics, but also cases of forming images, designs, and patterns on wide areas of the sheets P. While the sheets P are assumed to be sheets of paper in the present exemplary embodiment, fabric sheets or plastic films can be used.

As illustrated in FIG. 1B, the recording apparatus 200 includes, as sheet conveyance paths, a feed path 100, a reverse path 102, a circulation path 101, and a discharge path 104. A direction roughly from the feed path 100 toward the reverse path 102 or the discharge path 104 will be referred to as a first conveyance direction, and a direction from the reverse path 102 toward the circulation path 101 will be referred to as a second conveyance direction. In FIGS. 1B, 2A, and 2B, the sheets P (P1, P2, P3, and P4) are conveyed through the conveyance paths. The feed path 100 divides into the discharge path 104 and the reverse path 102. The reverse path 102 is connected to the circulation path 101, and the circulation path 101 is connected to the feed path 100.

A stacking portion 11 (11*a* and 11*b*) is disposed at a lower portion of the recording apparatus 200 and can stack the plurality of sheets P. Each sheet P on which recording is performed by a recording unit (described below) is discharged to a discharge unit 25. In the case of performing double-sided recording on the sheets P, each sheet P fed from the stacking portion 11 is conveyed from the feed path 100 to the recording unit, so that the recording unit records an image on a front side of the sheet P that faces a recording head 7. The sheet P then reaches the reverse path 102. A traveling direction of the sheet P is reversed in the reverse path 102, and the sheet P is conveyed through the circulation path 101 and reaches the feed path 100 again.

Thereafter, the sheet P is conveyed from the feed path 100 to the recording unit, so that the recording unit records an image on a back side of the sheet P. The sheet P with the images formed on the front and back sides is discharged through the discharge path 104 to the discharge unit 25. Motors that rotate rollers include feed motors 206 (206*a* and 206*b*), a conveyance motor 205, a discharge motor 215, and a reverse motor 216, as illustrated in FIG. 2A. The feed motors 206*a* and 206*b* can be a common motor. For detection of the sheets P, the recording apparatus 200 can include a sensor 17 at a position upstream of a first conveyance roller 5 in the first conveyance direction, a sensor 18 at a position upstream of a second reverse roller 27 in the first conveyance direction, and a sensor 19 at a position downstream of an intermediate roller 15*c* in the second conveyance direction, as illustrated in FIG. 2B. In the absence of the foregoing sensors, the position of the sheet P can be estimated based on the amount of conveyance of the sheet P from a sensor 16.

A pickup roller 2 is brought into contact with the uppermost sheet P stacked on the stacking portion 11 to pick up the uppermost sheet P. The pickup roller 2 is driven by the feed motor 206*a*. The sheet P picked up by the pickup roller 2 is fed along the feed path 100 by a feed roller 3. The pickup roller 2 is a one-way roller. Thus, after the sheet P is conveyed to a position downstream of the feed roller 3 in the first conveyance direction, even if the pickup roller 2 is stopped, the conveyance of the sheet P by the feed roller 3 can be continued. A feed driven roller 4 is biased against the feed roller 3, and the feed roller 3 and the feed driven roller 4 hold the sheet P and convey the sheet P to the first conveyance roller 5 in the first conveyance direction. The feed roller 3 is driven by the feed motor 206*b*. A pinch roller 6 is biased against the first conveyance roller 5 at a position downstream of the feed roller 3 in the first conveyance direction, and the first conveyance roller 5 and the pinch roller 6 hold the sheet P and convey the sheet P. The first conveyance roller 5 conveys the sheet P to the recording unit in the first conveyance direction. Between the feed roller 3 and the first conveyance roller 5, the sheet P is guided by guides. On the feed path 100, the sensor 16 is disposed downstream of the feed roller 3 in the first conveyance direction, and detects a leading edge or a trailing edge of the sheet P. It takes a certain time for the sensor 16 to detect edge portions of the plurality of sheets P continuously. The plurality of sheets P is thus conveyed continuously at predetermined intervals or more. More specifically, it takes a predetermined time for the sensor 16 to detect a leading edge of the sheet P2 (the second fed sheet) in the conveyance direction after detecting a trailing edge of the sheet P1 (the first fed sheet) in the conveyance direction.

The recording unit includes the recording head 7, the first conveyance roller 5, a second conveyance roller 10, and a platen 8. The recording head 7 ejects ink to the sheet P. The first conveyance roller 5 and the second conveyance roller 10 convey the sheet P. The platen 8 supports the sheet P. The first conveyance roller 5 and the second conveyance roller 10 are driven by the conveyance motor 205. The recording head 7 is mounted on a carriage 1 and is moved in a sheet width direction intersecting the first conveyance direction. The carriage 1 is driven by a carriage motor 204 (see FIG. 3). A recording operation of recording an image on the sheet P is performed by alternately repeating a conveyance operation of conveying the sheet P by a predetermined amount intermittently using the first conveyance roller 5 and an ejection operation of ejecting ink from the recording head 7 being moved. The sheet P with the image recorded thereon by the recording head 7 is conveyed in the first conveyance direction by the second conveyance roller 10. A spur roller 12 is biased against the second conveyance roller 10 and is rotated while being in contact with the recording side of the sheet P.

The sheet P conveyed by the second conveyance roller 10 is conveyed to the discharge path 104 (in a direction E) or the reverse path 102 (in a direction F) by a third conveyance roller 20 as illustrated in FIG. 1B. A third driven roller 21 is biased against the third conveyance roller 20. In a case where the sheet P is conveyed to the discharge path 104, the sheet P is discharged to the discharge unit 25 by a first discharge roller 22 in a state where the side of the sheet P that faces the recording head 7 faces downward. In a case where the sheet P is conveyed to the reverse path 102, the sheet P is conveyed by the second reverse roller 27 and a reverse roller 9. The second reverse roller 27 and the reverse roller 9 are driven by the reverse motor 216. The conveyance direction of the sheet P is switched by flappers 24*a* and 24*b*. The flappers 24*a* and 24*b* are driven to move by a flapper solenoid 217 (see FIG. 3). A solenoid driver 220 (see FIG. 3) controls the flapper solenoid 217.

In the case of conveying the sheet P to the discharge path 104, the flapper 24*a* is at a first position. The sheet P conveyed by the second conveyance roller 10 is conveyed by the third conveyance roller 20, the first discharge roller 22, and a second discharge roller 26. The first discharge roller 22, the second discharge roller 26, and the third conveyance roller 20 are driven by the discharge motor 215. In the case of conveying the sheet P to the reverse path 102, the flappers 24*a* and 24*b* are at a second position. On the reverse path 102, the reverse roller 9 and the second reverse roller 27 are rotated in a forward direction (a direction A) and a reverse direction (a direction B) by the reverse motor 216. A reverse driven roller 13 is biased against the reverse roller 9, and the reverse driven roller 13 and the reverse roller 9 hold the sheet P and convey the sheet P. In a case where the reverse roller 9 is rotated in the forward direction, the sheet P is conveyed in a direction (a direction C) that exposes the sheet P from the recording apparatus 200. After a trailing edge portion of the sheet P passes the flapper 24*b*, the reverse roller 9 and the second reverse roller 27 are rotated in the reverse direction by the reverse motor 216. The sheet P having passed the flapper 24*b* is detected by the sensor 18. In a case where the sheet P2 overlaps the sheet P1, the sheet P2 is detected by the sensor 18. In the case of the absence of the sensor 18, the position of the trailing edge of the sheet P is estimated based on the conveyance amount of the sheet P.

After the flapper 24*b* is switched from the second position to the first position, the reverse roller 9 and the second reverse roller 27 are rotated in the reverse direction (the direction B). As a result, the traveling direction of the sheet P is successfully reversed. In a case where the second sheet P2 overlaps the sheet P1, the traveling direction of the sheet P1 and the traveling direction of the second sheet P2 are each reversed. The sheet P is then conveyed in a direction D toward the circulation path 101 through the reverse path 102 along the guides. Intermediate rollers 15*a*, 15*b*, and 15*c* are rotated by a predetermined amount to convey the sheet P to the feed roller 3. On the circulation path 101, the intermediate rollers 15*a*, 15*b*, and 15*c* are each driven by the reverse motor 216. A configuration that detects the leading edge of the sheet P in the second conveyance direction using the sensor 19 can be used. In the circulation path 101, the sheets P1 and P2 can be retained to adjust the timing of conveying the sheets P1 and P2 and the timing of feeding the sheets P3 and P4 from the stacking portion 11.

Figure 3:
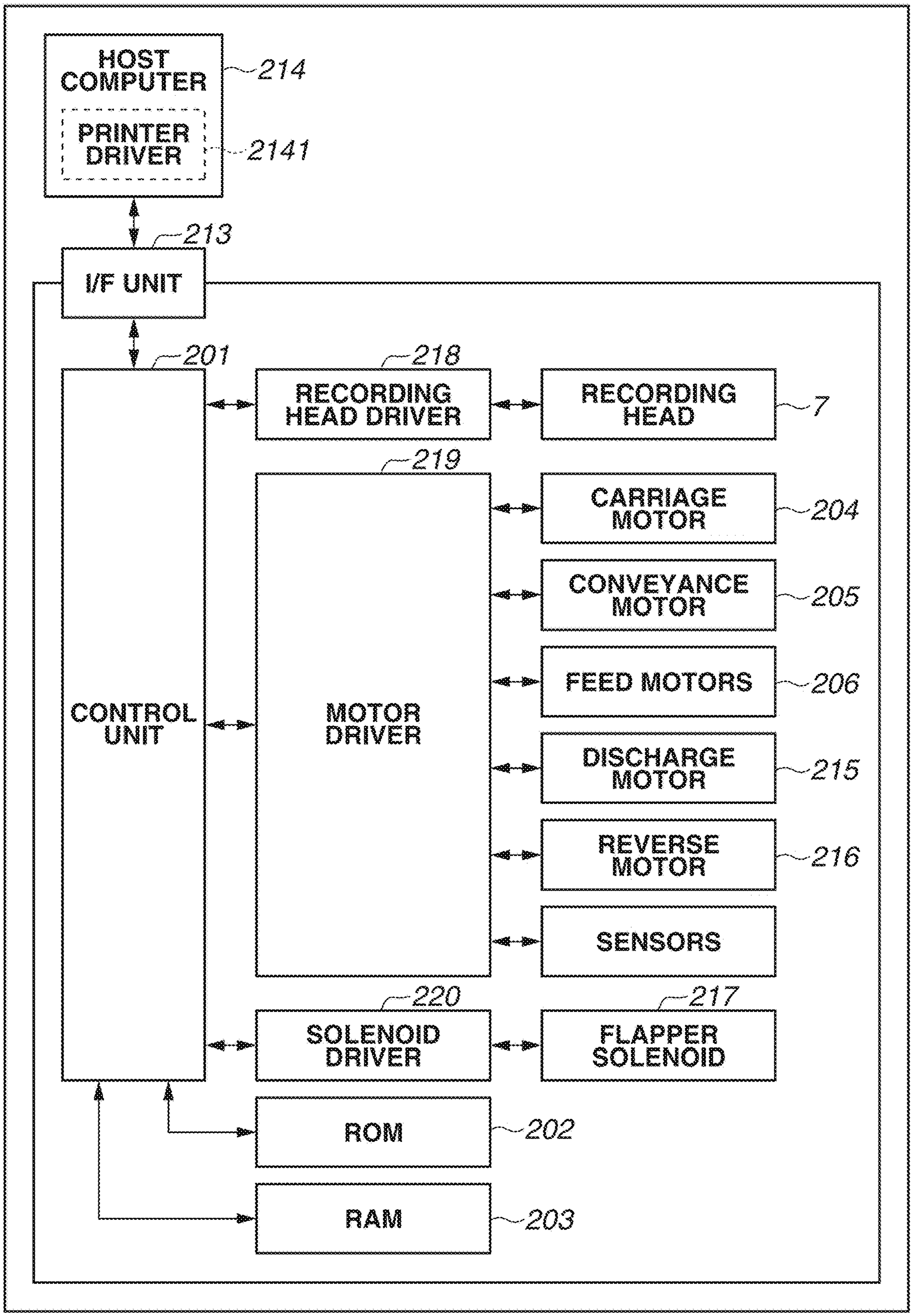
FIG. 3 is a block diagram illustrating a control system of the recording apparatus.

FIG. 3 is a block diagram illustrating a control system of the recording apparatus 200. A control unit 201 receives signals from various sensors, drives various motors, performs various operations, and processes data. The various operations include the recording operation, the conveyance operation, a reversing operation, a discharging operation, and the ejection operation. The various sensors include the sensors 16 to 19. In the conveyance operation, the control unit 201 can control the sheet conveyance so that a trailing edge portion of the preceding sheet P and a leading edge portion of the subsequent sheet P overlap. A read-only memory (ROM) 202 stores programs and data to be executed by the control unit 201. A random-access memory (RAM) 203 temporarily stores processing data executed by the control unit 201 and data received from a host computer 214. The host computer 214 includes a printer driver 2141. The printer driver 2141 compiles recording images and recording information such as recording image quality, and communicates with the recording apparatus 200. The control unit 201 can communicate with the host computer 214 via an interface (UF) unit 213. In a case where recording data is transmitted from the host computer 214 via the I/F unit 213, the control unit 201 processes the recording data, and the processed recording data is loaded into the RAM 203. The control unit 201 then starts the recording operation based on the loaded data.

The recording head 7 is controlled by a recording head driver 218 and ejects ink. The carriage 1 is driven by the carriage motor 204 and can move back and forth in the sheet width direction.

The pickup roller 2 is driven by the feed motor 206*a*. The feed roller 3 is driven by the feed motor 206*b*. The first conveyance roller 5 and the second conveyance roller 10 are driven by the conveyance motor 205. The various motors are controlled by a motor driver 219 representing a plurality of motor drivers. The various rollers are each provided with an encoder sensor (not illustrated) for detecting passage of light through slits of a code wheel. The control unit 201 detects the conveyance speed and amount of each roller by counting the numbers of slits of the encoder sensor through which the light passes. The code wheel and the encoder sensor are not necessarily positioned coaxially with the corresponding roller. The flappers 24 (24*a* and 24*b*) are driven by the flapper solenoid 217. The flapper solenoid 217 is controlled by the solenoid driver 220.

<Control Flowchart>

A case where double-sided recording is performed on four sheets P1 to P4 in a single job will be described. FIG. 4 illustrates orders in the case of continuous recording on four sheets P1 to P4. Recording data includes double-sided data corresponding to a first sheet, double-sided data corresponding to a second sheet, double-sided data corresponding to a third sheet, and double-sided data corresponding to a fourth sheet. Each double-sided data includes data corresponding to a front side and data corresponding to a back side opposite to the front side. The control unit 201 performs control to discharge the first, second, third, and fourth sheets in this order. The sheets P1, P2, P3, and P4 are fed from the stacking portion 11 in this order. In the example of FIG. 4, the recording order is set so that the sheets P1 to P4 are discharged with the front sides facing downward. Thus, the double-sided data corresponding to the second sheet is recorded on the sheet P1 fed first, the double-sided data corresponding to the first sheet is recorded on the sheet P2 fed second, the double-sided data corresponding to the fourth sheet is recorded on the sheet P3 fed third, and the double-sided data corresponding to the third sheet is recorded on the sheet P4 fed fourth. The control unit 201 controls the recording head 7 to perform the recording on the back side of the sheet P1, the back side of the sheet P2, the back side of the sheet P3, and the back side of the sheet P4 in this order. Next, the control unit 201 controls the recording head 7 to perform the recording on the front side of the sheet P2, the front side of the sheet P1, the front side of the sheet P4, and the front side of the sheet P3 in this order. Consequently, the sheet P2 (the first sheet), the sheet P1 (the second sheet), the sheet P4 (the third sheet), and the sheet P3 (the fourth sheet) are discharged in this order to the discharge unit 25.

The recording order is not limited thereto. For example, the recording apparatus 200 can be configured to discharge the sheets P with the front sides facing upward to the stacking portion 11 provided on the rear side and diverged from the reverse path 102. In this case, the control unit 201 feeds the sheet P3 fed third, the sheet P4 fed fourth, the sheet P1 fed first, and the sheet P2 fed second in this order and performs the recording operation on both the back and front sides. Consequently, the fourth sheet, the third sheet, the second sheet, and the first sheet are discharged in this order from the bottom with the front sides facing upward. Further, in the present example, the sheet P1 is recorded in a state where the leading edge of the sheet P2 overlaps the sheet P1, and the sheet P3 is recorded in a state where the sheet P4 overlaps the sheet P3. There may be a case where recording data does not satisfy an overlapping condition and the sheets P1 and P2 are not to be overlapped or a case where recording data does not satisfy the overlapping condition and the sheets P3 and P4 are not to be overlapped. In the case of continuous recording on the sheets P, a combination of a case where the sheets P are to be overlapped and a case where the sheets P are not to be overlapped can be set based on recording data. Further, in the case of continuous one-sided recording, the sheets P are discharged with the front sides facing downward without being conveyed to the reverse path 102. In this case, the control unit 201 performs the recording operation to record the recording data corresponding to the first sheet on the front side of the sheet P1 fed first, the recording data corresponding to the second sheet on the front side of the sheet P2 fed second, the recording data corresponding to the third sheet on the front side of the sheet P3 fed third, and the recording data corresponding to the fourth sheet on the front side of the sheet P4 fed fourth in this order.

Figure 5:
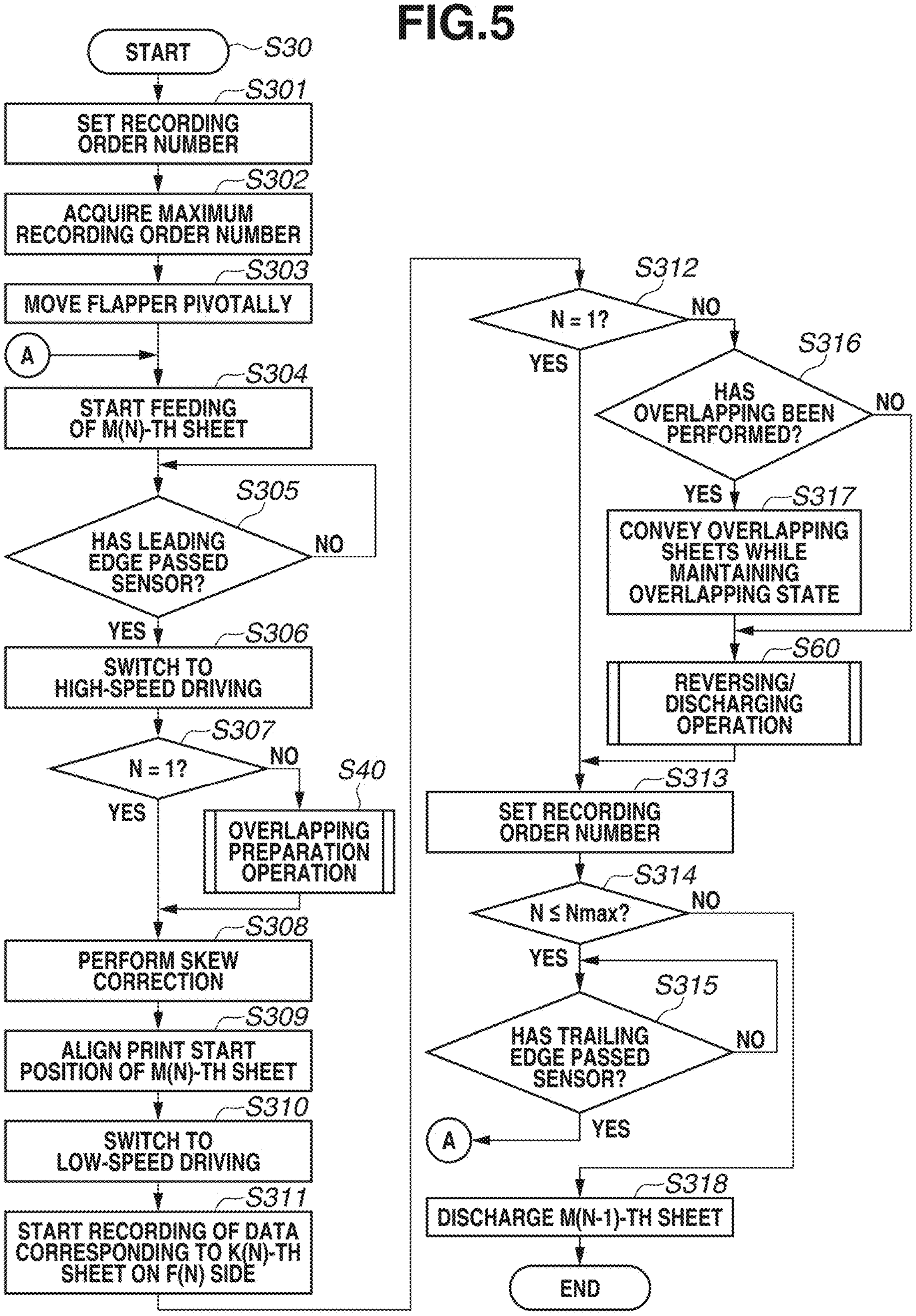
FIG. 5 is a flowchart illustrating a recording operation.
Figure 6:
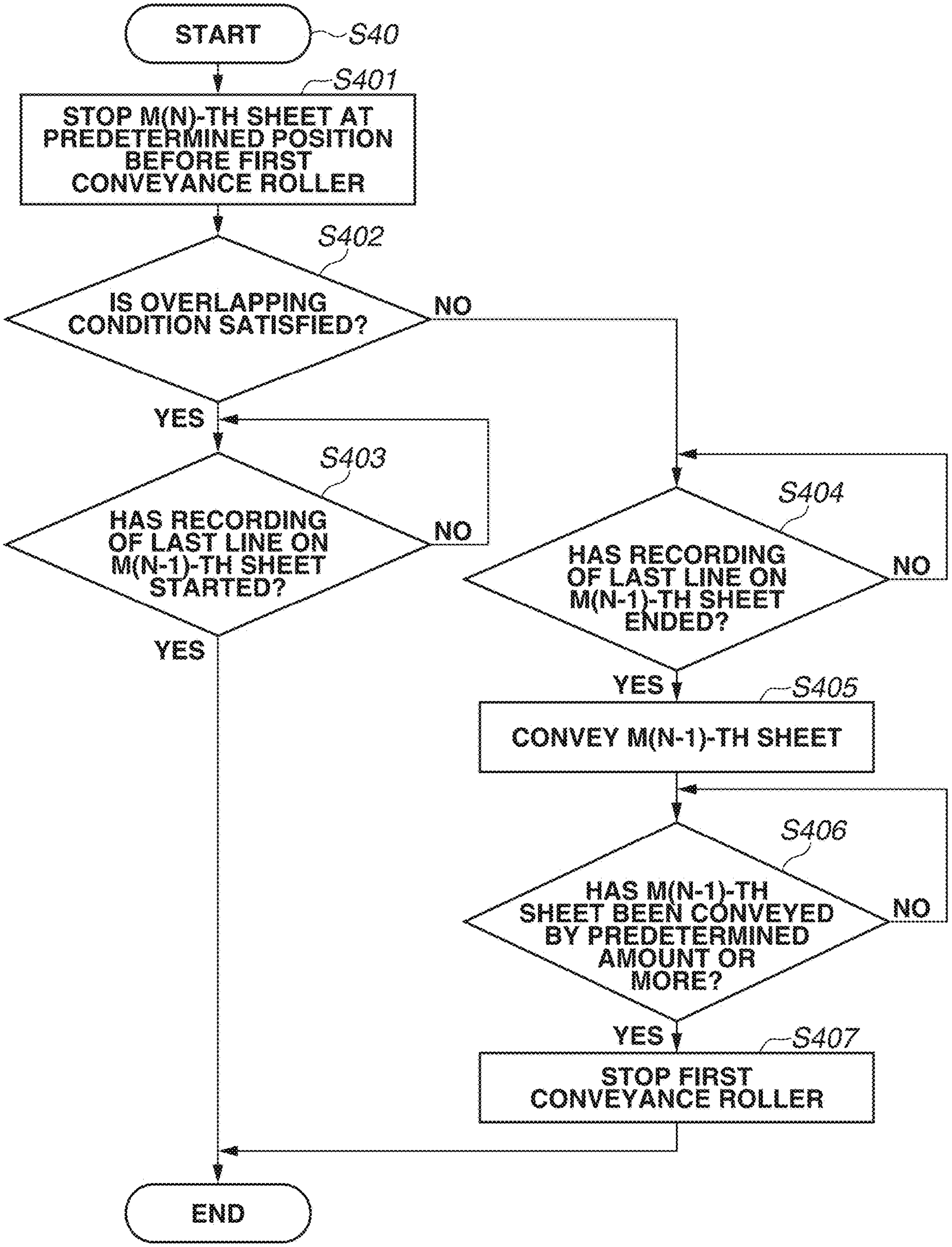
FIG. 6 is a flowchart illustrating an overlapping preparation operation.
Figure 7:
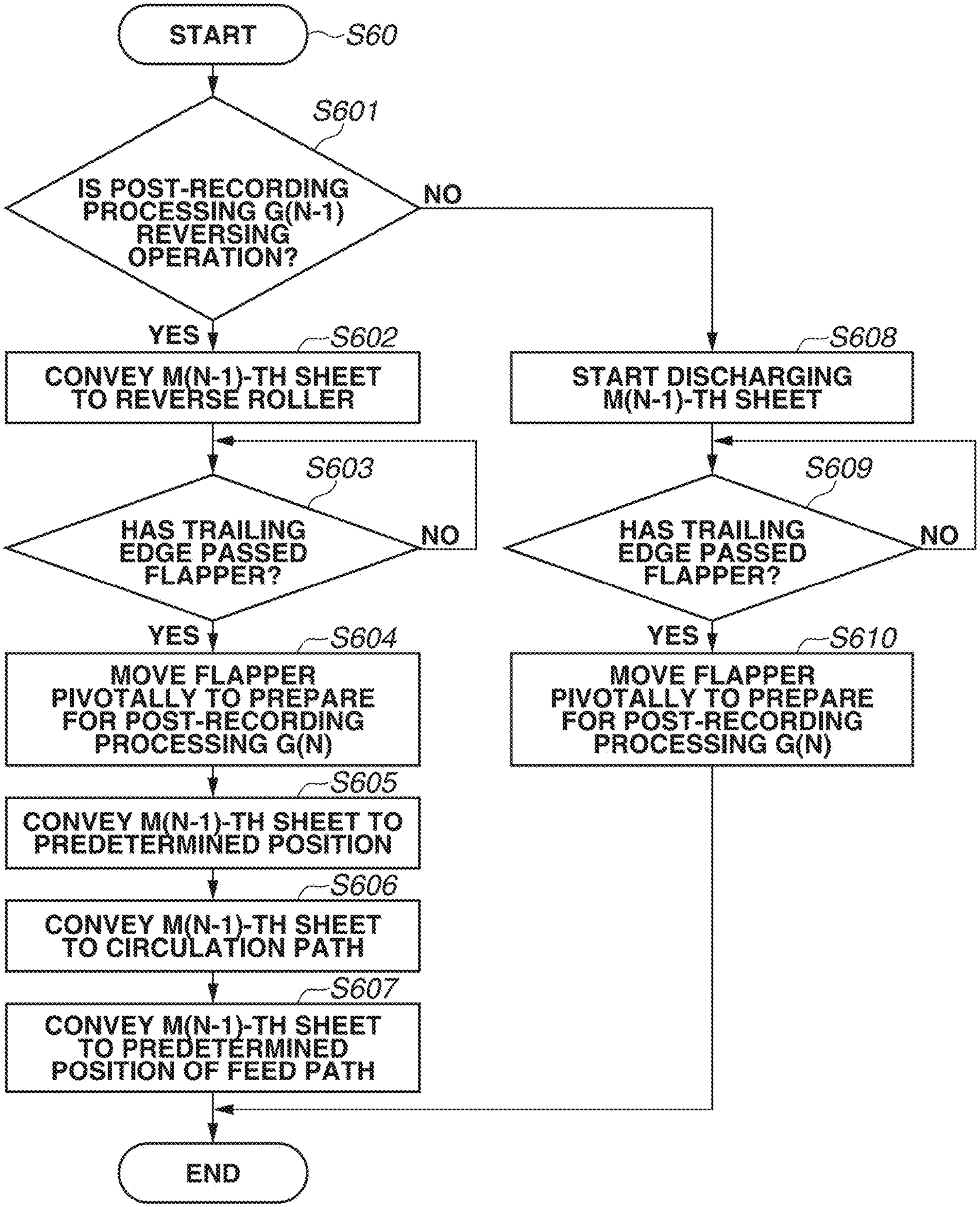
FIG. 7 is a flowchart illustrating a reversing/discharging operation.

Flowcharts illustrating the recording operation will be described below with reference to FIGS. 5 to 7. The recording operation is included herein in addition to the recording order in FIG. 4. FIG. 5 is a flowchart illustrating the recording operation. FIG. 6 is a flowchart illustrating an overlapping preparation operation. FIG. 7 is a flowchart illustrating a reversing/discharging operation. In the recording operation, a recording order number N is assigned as a variable number as illustrated in FIG. 4, and the recording is performed based on the recording order number N. In FIG. 4, the M(N)-th sheet P is fed from a feed source Q(N), where M is the sheets P1 to P4 fed in this order and Q is the stacking portion 11 or the reverse path 102. After the feeding, the control unit 201 records recording data corresponding to the K(N)th-sheet on the F(N) side of the M(N)-th sheet P and performs post-recording processing G(N), where F is the front side or the back side, K is 1 to 4, and G is the reversing operation or the discharging operation. A maximum recording order number Nmax is 8 in the example of FIG. 4.

When recording data for double-sided recording is transmitted from the host computer 214 via the I/F unit 213, the control unit 201 performs step S30 to start a double-sided recording operation.

In step S301, the control unit 201 sets the recording order number N to 1. In step S302, the control unit 201 acquires the maximum recording order number Nmax based on the recording data. In step S303, the control unit 201 pivotally moves the flappers 24*a* and 24*b* in advance to prepare for the post-recording processing G(N) on the M(N)-th sheet P on which the recording is performed.

In step S304, the control unit 201 starts feeding of the M(N)-th sheet P from the feed source Q(N) to achieve a feed speed of 7.6 inch/sec. In a case where the feed source Q(N) is the stacking portion 11, the feed motor 206*a* is driven at low speed, whereby the pickup roller 2 is rotated to achieve a feed speed of 7.6 inch/sec. When the pickup roller 2 is rotated, the uppermost sheet P stacked on the stacking portion 11 is picked up. The sheet P picked up by the pickup roller 2 is fed by the feed roller 3 being rotated in the same direction as the rotation direction of the pickup roller 2. The feed roller 3 is driven to achieve the same feed speed as that of the pickup roller 2. The pickup roller 2 feeds the sheet P to a position downstream of the feed roller 3 in the first conveyance direction and is stopped to prevent the next sheet P from being picked up. In a case where the feed source Q(N) is the reverse path 102, the reverse motor 216 is reversed, and the feed motor 206*b* is driven at low speed. Consequently, the intermediate rollers 15*a*, 15*b*, and 15*c* and the feed roller 3 are rotated to achieve a conveyance speed of 7.6 inch/sec. Then, the sheet P is conveyed in the direction toward the first conveyance roller 5 from the circulation path 101 through the feed path 100 by the intermediate rollers 15*a*, 15*b*, and 15*c* and the feed roller 3.

In step S305, the control unit 201 determines whether the leading edge of the M(N)-th sheet P has passed the sensor 16. In a case where the control unit 201 determines that the leading edge of the M(N)-th sheet P has not passed the sensor 16 (NO in step S305), the processing of step S305 is repeated. In a case where the control unit 201 determines that the leading edge of the M(N)-th sheet P has passed the sensor 16 (YES in step S305), the processing proceeds to step S306. In step S306, the control unit 201 switches the feed motor 206*b* to high-speed driving to convey the M(N)-th sheet at a conveyance speed of 20 inch/sec. Consequently, in a case where the preceding sheet P, i.e., the M(N−1)-th sheet P is present, the M(N)-th sheet P reaches the M(N−1)-th sheet P.

In step S307, the control unit 201 determines whether the recording order number N is 1. In a case where the control unit 201 determines that the recording order number N is 1 (YES in step S307), since the preceding sheet P is not present, the processing proceeds to step S308. In a case where the control unit 201 determines that the recording order number N is not 1 (NO in step S307), since there is a possibility of continuous conveyance in an overlapping state, the processing proceeds to step S40 to perform the overlapping preparation operation.

The overlapping preparation operation in step S40 will be described with reference to FIG. 6. In step S401, the control unit 201 stops, at a predetermined position before the first conveyance roller 5, the M(N)-th sheet P on which the recording is to be performed next. The position of the leading edge of the M(N)-th sheet P is calculated based on the amount of rotation of the feed roller 3 after the detection by the sensor 16. In a case where the sensor 17 is provided, the position can be calculated based on detection by the sensor 17.

In step S402, the control unit 201 determines whether a predetermined overlapping condition is satisfied. In a case where the control unit 201 determines that the overlapping condition is satisfied (YES in step S402), the processing proceeds to step S403. In step S403, the control unit 201 determines whether the recording of the last line on the M(N−1)-th sheet P, on which the recording is being performed, has started. In a case where the recording of the last line on the M(N−1)-th sheet P has started (YES in step S403), the processing proceeds to step S308 in FIG. 5.

In a case where the control unit 201 determines that the overlapping condition is not satisfied (NO in step S402), the processing proceeds to step S404. A case where the overlapping condition is not satisfied is, for example, a case where the M(N−1)-th sheet P does not have enough margins for overlapping. By sequentially performing steps S404 to S407 (described below), it is possible to perform an operation of cancelling an overlapping state or an operation for a case where the M(N)-th sheet P is unable to reach the preceding sheet P, i.e., the M(N−1)-th sheet P.

In step S404, the control unit 201 determines whether the recording of the last line on the M(N−1)-th sheet P has ended. In a case where the control unit 201 determines that the recording of the last line on the M(N−1)-th sheet P has not ended (NO in step S404), the processing of step S404 is repeated. In a case where the control unit 201 determines that the recording of the last line on the M(N−1)-th sheet P has ended (YES in step S404), the processing proceeds to step S405. In step S405, the control unit 201 conveys the M(N−1)-th sheet P using the first conveyance roller 5 at a conveyance speed of 18 inch/s. In step S406, the control unit 201 determines whether the M(N−1)-th sheet P has been conveyed by a predetermined amount or more after the trailing edge of the M(N−1)-th sheet P passes the first conveyance roller 5.

In a case where the control unit 201 determines that the M(N−1)-th sheet P has been conveyed by the predetermined amount or more after the trailing edge of the M(N−1)-th sheet P passes the first conveyance roller 5 (YES in step S406), the processing proceeds to step S407. In step S407, the control unit 201 stops the first conveyance roller 5, and the processing proceeds to step S308 in FIG. 5.

By performing steps S404 to S407 as described above, in a case where the sheets P are in an overlapping state but the overlapping condition is not satisfied, the overlapping state is canceled. In a case where the overlapping state is canceled or in a case where the M(N)-th sheet P is unable to reach the M(N−1)-th sheet P, a preparation for skew correction on the M(N)-th sheet P alone is performed.

In step S308, the control unit 201 performs the skew correction on the M(N)-th sheet P.

When the feed roller 3 is driven while the first conveyance roller 5 is stopped for the ejection operation, the leading edge of the M(N)-th sheet P hits a conveyance nip portion. Consequently, the skew of the M(N)-th sheet P is corrected. In a case where the overlapping condition in step S402 is satisfied, the skew of the M(N)-th sheet P is corrected in the overlapping state with the M(N−1)-th sheet P. In a case where the preceding sheet P is not present, the skew correction is performed on the M(N)-th sheet P alone. In a case where the overlapping condition is not satisfied, the skew correction is performed on the M(N)-th sheet P alone.

In step S309, the control unit 201 aligns the print start position of the M(N)-th sheet P. By rotating the first conveyance roller 5 by a predetermined amount, it is possible to align the print start position of the M(N)-th sheet P. At this time, in a case where the skew correction is performed on the M(N)-th sheet P in the overlapping state with the M(N−1)-th sheet P, the print start position of the M(N)-th sheet P is aligned while the overlapping state is maintained.

In step S310, the control unit 201 switches the feed speed of the M(N)-th sheet P to 7.6 inch/sec. When the feed motor 206*b* is switched to low-speed driving, the feed roller 3 is rotated at 7.6 inch/sec.

In step S311, the control unit 201 starts the recording operation of recording the data corresponding to the K(N)-th sheet on the F(N) side of the M(N)-th sheet P. While the M(N)-th sheet P is conveyed by a predetermined amount intermittently by the first conveyance roller 5, the feed roller 3 is also driven intermittently. During the intermittent conveyance, the ejection operation is performed, and the recording is performed sequentially.

In step S312, the control unit 201 determines whether the recording order number N is 1. In a case where the control unit 201 determines that the recording order number N is 1 (YES in step S312), the processing proceeds to step S313. In a case where the control unit 201 determines that the recording order number N is not 1 (NO in step S312), the processing proceeds to step S316.

In step S316, the control unit 201 determines whether the overlapping has been performed. In a case where the control unit 201 determines that the overlapping has been performed (YES in step S316), the processing proceeds to step S317. In step S317, the control unit 201 conveys the overlapping sheets P while maintaining the overlapping state and performs the reversing/discharging operation in step S60. In a case where the control unit 201 determines that the overlapping has not been performed (NO in step S316), the reversing/discharging operation is performed on the sheet P alone in step S60.

The reversing/discharging operation in step S60 will be described with reference to FIG. 7. In step S601, the control unit 201 determines whether the post-recording processing G(N−1) on the preceding sheet P (the M(N−1)-th sheet P) is the reversing operation. In a case where the preceding sheet P (the M(N−1)-th sheet P) is in the overlapping state with the M(N)-th sheet, the determination is performed based on the M(N)-th sheet. In a case where the control unit 201 determines that the post-recording processing G(N−1) on the preceding sheet P (the M(N−1)-th sheet P) is the reversing operation (YES in step S601), the processing proceeds to step S602. In step S602, the control unit 201 conveys the M(N−1)-th sheet P on which the recording is performed, to the reverse roller 9. Based on the condition, the M(N−1)-th sheet P is conveyed while the overlapping state is maintained.

In step S603, the control unit 201 determines whether the trailing edge of the M(N−1)-th sheet P has passed the flapper 24*b*. The determination of whether the trailing edge of the M(N−1)-th sheet P has passed the flapper 24*b* is performed based on the amounts of rotation of the various rollers. In a case where the sensor 18 is provided, the determination can be performed based on a signal from the sensor 18. In a case where the control unit 201 determines that the trailing edge of the M(N−1)-th sheet P has passed the flapper 24*b* (YES in step S603), the processing proceeds to step S604.

In step S604, the control unit 201 pivotally moves the flappers 24*a* and 24*b* to prepare for the post-recording processing G(N) on the M(N)-th sheet as the next recording target.

In step S605, the control unit 201 continuously conveys the M(N−1)-th sheet P until the trailing edge of the M(N−1)-th sheet P reaches a predetermined position upstream of the reverse roller 9 in the first conveyance direction. After the trailing edge of the M(N−1)-th sheet P reaches the predetermined position, the processing proceeds to step S606. In step S606, the control unit 201 reverses the conveyance direction of the M(N−1)-th sheet P and conveys the M(N−1)-th sheet P to the circulation path 101. By switching the reverse motor 216 to the high-speed driving in the reverse rotation, the reverse roller 9 and the intermediate rollers 15*a*, 15*b*, and 15*c* are driven to achieve a conveyance speed of 18 inch/sec. In step S607, the control unit 201 conveys the M(N−1)-th sheet P until the leading edge of the M(N−1)-th sheet P in the second conveyance direction reaches a predetermined position of the feed path 100. After the processing of step S607 is ended, the processing proceeds to step S313 in FIG. 5.

In a case where the control unit 201 determines that the post-recording processing G(N−1) on the preceding sheet P (the M(N−1)-th sheet P) is the discharging operation (NO in step S601), the processing proceeds to step S608. In step S608, the control unit 201 discharges the M(N−1)-th sheet P to the discharge unit 25 by rotating the first discharge roller 22 and the third conveyance roller 20. In a case where the M(N−1)-th sheet P is in the overlapping state with the M(N)-th sheet, the overlapping state is canceled.

In step S609, the control unit 201 determines whether the trailing edge of the M(N−1)-th sheet P in the first conveyance direction has passed the flapper 24*a*. The determination of whether the trailing edge of the M(N−1)-th sheet P in the first conveyance direction has passed the flapper 24*a* is performed based on the amounts of rotation of the various rollers. Alternatively, a sensor can be provided, and the determination can be performed using the sensor. In a case where the control unit 201 determines that the trailing edge of the M(N−1)-th sheet P in the first conveyance direction has passed the flapper 24*a* (YES in step S609), the processing proceeds to step S610.

In step S610, the control unit 201 pivotally moves the flappers 24*a* and 24*b* to prepare for the post-recording processing G(N) on the M(N)-th sheet P as the next recording target. After the processing of step S610 is ended, the processing proceeds to step S313 in FIG. 5.

In step S313, the control unit 201 increments the recording order number N and sets the recording order number N to N+1.

In step S314, the control unit 201 determines whether the recording order number N is less than or equal to the maximum recording order number Nmax. In a case where the control unit 201 determines that the recording order number N is less than or equal to the maximum recording order number Nmax (YES in step S314), the processing proceeds to step S315. In step S315, the control unit 201 determines whether the trailing edge of the M(N−1)-th sheet P has passed the sensor 16. In a case where the control unit 201 determines that the trailing edge of the M(N−1)-th sheet P has passed the sensor 16 (YES in step S315), the processing returns to step S304.

In a case where the control unit 201 determines that the recording order number N is greater than the maximum recording order number Nmax (NO in step S314), the processing proceeds to step S318. In step S318, the control unit 201 discharges the M(N−1)-th sheet P. Rotating the first discharge roller 22, the third conveyance roller 20, the second conveyance roller 10, and the first conveyance roller 5 in the same direction enables discharging the M(N−1)-th sheet P to the discharge unit 25. In this manner, the M(Nmax)-th sheet P is discharged, so that the recording operation is ended after all the sheets P are discharged.

<Conveyance Control>

Figure 8:
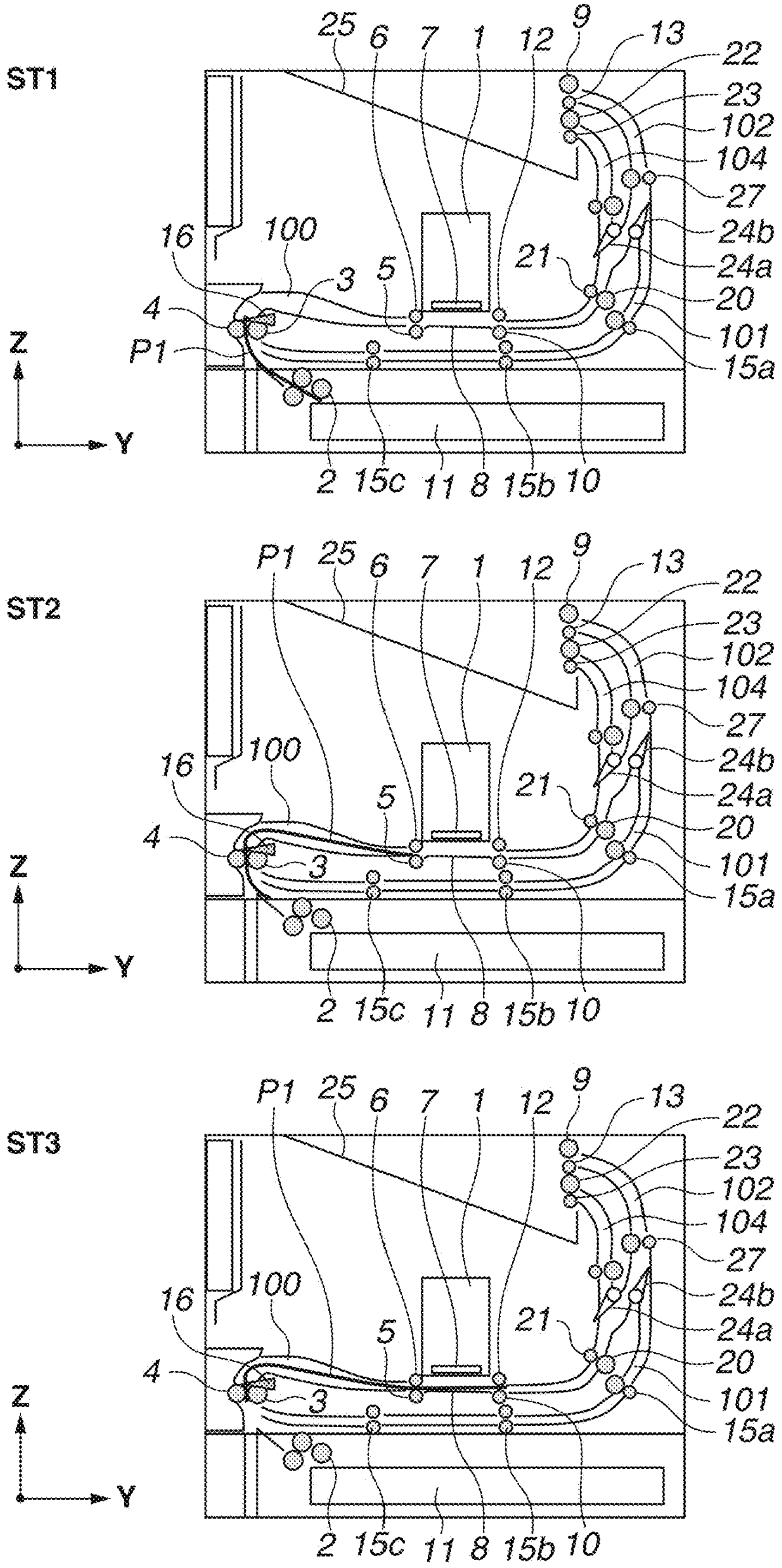
FIG. 8 is a view illustrating how the sheet P1 is picked up and conveyed.

A case where the recording is performed in the recording order specified in FIG. 4 will be described. FIGS. 8 to 13 illustrate states ST1 to ST17 of the sheets P in the recording operation. FIG. 8 illustrates a state where the sheet P1 picked up first is conveyed to the recording unit. In FIG. 8, the state changes to ST1, ST2, and ST3 in this order. In the state ST1, the feed motor 206*a* is driven at low speed, and the pickup roller 2 is rotated to pick up the sheet P1 at a feed speed of 7.6 inch/sec. When the pickup roller 2 is rotated, the uppermost sheet P stacked on the stacking portion 11 is picked up. The sheet P1 picked up by the pickup roller 2 is fed by the feed roller 3 being rotated together with the pickup roller 2. At this time, the control unit 201 drives the feed roller 3 to achieve the same feed speed as that of the pickup roller 2. After feeding the sheet P1 to a position downstream of the feed roller 3, the control unit 201 stops the pickup roller 2 to prevent the pickup roller 2 from immediately picking up the sheet P2 to be picked up next. In a case where the leading edge of the sheet P1 is detected by the sensor 16 provided downstream of the feed roller 3, the control unit 201 switches the feed motor 206*b* to the high-speed driving, and the feed roller 3 is rotated to feed the sheet P1 at a feed speed of 20 inch/sec.

As indicated by the state ST2, in a case where the feed roller 3 is continuously rotated, the leading edge of the sheet P1 in the first conveyance direction hits the conveyance nip portion formed by the first conveyance roller 5 and the pinch roller 6.

At this time, the first conveyance roller 5 is being stopped. The control unit 201 rotates the feed roller 3 by a predetermined amount in a state where the leading edge of the sheet P1 hits the conveyance nip portion. Consequently, the sheet P1 becomes parallel to the first conveyance roller 5, and the skew of the sheet P1 is corrected. Further, the leading edge of the sheet P1 is positioned at the position of the first conveyance roller 5 by hitting the conveyance nip portion. Thereafter, the control unit 201 performs control to align the print start position of the sheet P1 and convey the sheet P1, using the position of the first conveyance roller 5 as a reference.

After the skew correction on the sheet P1 is ended, the control unit 201 starts rotating the first conveyance roller 5 using the conveyance motor 205 as indicated by the state ST3. At this time, the first conveyance roller 5 conveys the sheet P1 at a conveyance speed of 15 inch/sec, so that the print start position of the sheet P1 is aligned with a position facing the recording head 7. Thereafter, the control unit 201 starts the recording operation of recording the recording data corresponding to the back side of the second sheet on the top side of the sheet P1 that faces the recording head 7 by ejecting ink from the recording head 7.

After the print start position of the sheet P1 is aligned, the control unit 201 switches the feed motor 206*b* to the low-speed driving. More specifically, the feed roller 3 is rotated to feed the sheet P1 at a feed speed of 7.6 inch/sec. While the sheet P1 fed first is conveyed by a predetermined amount intermittently by the first conveyance roller 5, the feed roller 3 is driven intermittently in synchronization with the first conveyance roller 5. More specifically, while the first conveyance roller 5 is rotated, the feed roller 3 is also rotated, and while the first conveyance roller 5 is stopped, the feed roller 3 is also stopped. The rotation speed of the feed roller 3 is controlled to be lower than the rotation speed of the first conveyance roller 5. Thus, the sheet P1 is stretched between the first conveyance roller 5 and the feed roller 3. The feed roller 3 is dragged by the sheet P1 being conveyed by the first conveyance roller 5. While the sheet P1 is conveyed by a predetermined amount intermittently by the first conveyance roller 5, the third conveyance roller 20 is driven intermittently to achieve the same sheet conveyance speed as that of the first conveyance roller 5.

Figure 9:
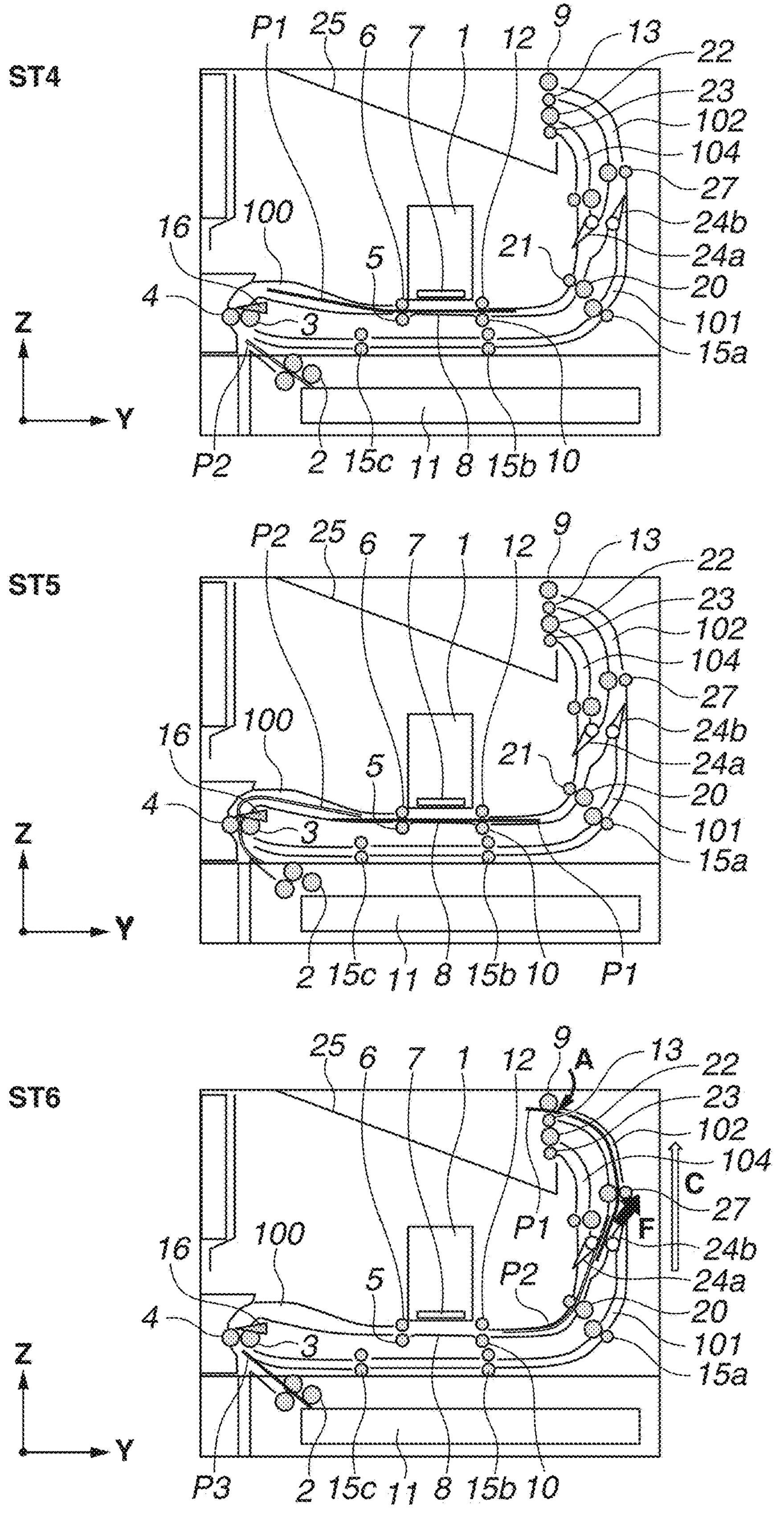
FIG. 9 is a view illustrating how the sheets P1 and P2 are overlapped and conveyed.

FIG. 9 illustrates a state where the sheet P2 is overlapped on the sheet P1 and the overlapping sheets P1 and P2 are conveyed. In FIG. 9, the state changes to ST4, ST5, and ST6 in this order. After the trailing edge of the sheet P1 passes the sensor 16, the control unit 201 performs a pickup operation of the sheet P2 to be picked up second. The control unit 201 also controls the start of rotation of the pickup roller 2 so that an interval between the trailing edge of the sheet P1 and the leading edge of the sheet P2 in the first conveyance direction is greater than or equal to a predetermined distance. Positions of the leading and trailing edges of the sheets P1 and P2 are calculated based on the amounts of rotation of the various rollers. In a case where the sensors 17 and 18 are provided, the calculation can be performed based on detection by the sensors 17 and 18.

As indicated by the state ST4, the sheet P2 picked up second by the pickup roller 2 is fed by the feed roller 3. At this time, the recording is being performed on the sheet P1 by the recording head 7 based on the recording data corresponding to the back side of the second sheet. When the leading edge of the sheet P2 is detected by the sensor 16, the control unit 201 switches the feed motor 206*b* to continuous conveyance. At this time, the feed roller 3 is driven to achieve a conveyance speed of 20 inch/sec for high-speed driving. Alternatively, the feed motor 206*b* can be switched to the continuous conveyance when the trailing edge of the sheet P1 is detected by the sensor 16.

As indicated by the state ST5, since the conveyance speed of the sheet P2 is higher than the conveyance speed of the sheet P1 in the recording operation, the leading edge of the sheet P2 is overlapped on the sheet P1. More specifically, since the recording operation is being performed on the sheet P1 based on the recording data corresponding to the back side of the second sheet, the sheet P1 is conveyed intermittently by the first conveyance roller 5 at a conveyance speed of 7.6 inch/sec. Meanwhile, the sheet P2 on which the recording is to be performed next by the recording head 7 is continuously conveyed at a conveyance speed of 20 inch/sec using the feed roller 3 after the leading edge of the sheet P2 is detected by the sensor 16, thereby reaching the sheet P1. Thereafter, the sheet P2 is fed by the feed roller 3 until the leading edge of the sheet P2 is stopped at a predetermined position upstream of the conveyance nip portion in the first conveyance direction. The position of the leading edge of the sheet P2 is calculated based on the amount of rotation of the feed roller 3 after the detection of the leading edge of the sheet P2 in the conveyance direction by the sensor 16, and the control is performed based on this calculation result. In recording the last line on the sheet P1, the control unit 201 rotates the feed roller 3 by a predetermined amount in a state where the leading edge of the sheet P2 hits the conveyance nip portion. During the ejection operation by the recording head 7, the first conveyance roller 5 is stopped. Consequently, the sheet P2 becomes parallel to the first conveyance roller 5, and the skew of the sheet P2 is corrected. In a case where the sensor 17 is provided upstream of the first conveyance roller 5, the sheet P2 can be stopped at a predetermined position upstream of the conveyance nip portion based on detection by the sensor 17.

At this time, the flapper 24*a* is at the second position, and the flapper 24*b* is at the second position. Thus, the sheet P1 on which the recording is completed is conveyed to the reverse path 102 by the rotation of the third conveyance roller 20. Meanwhile, the control unit 201 performs the recording operation on the sheet P2 following the sheet P1. The control unit 201 performs the recording operation on the sheet P2 using the recording head 7 based on the recording data corresponding to the back side of the first sheet. After the recording of the last line on the sheet P2 is ended, as indicated by the state ST6, the control unit 201 conveys the sheets P1 and P2 to the reverse path 102 by rotating the third conveyance roller 20 by a predetermined amount while maintaining the overlapping state of the sheets P1 and P2. During the foregoing process, the control unit 201 further performs the pickup operation of the sheet P3 to be picked up third, using the pickup roller 2. Thereafter, the sheet P3 picked up by the pickup roller 2 is fed continuously by the feed roller 3 with an interval between the sheets P2 and P3. At this time, the leading edge of the sheet P3 is not overlapped on the sheet P2.

Figure 10:
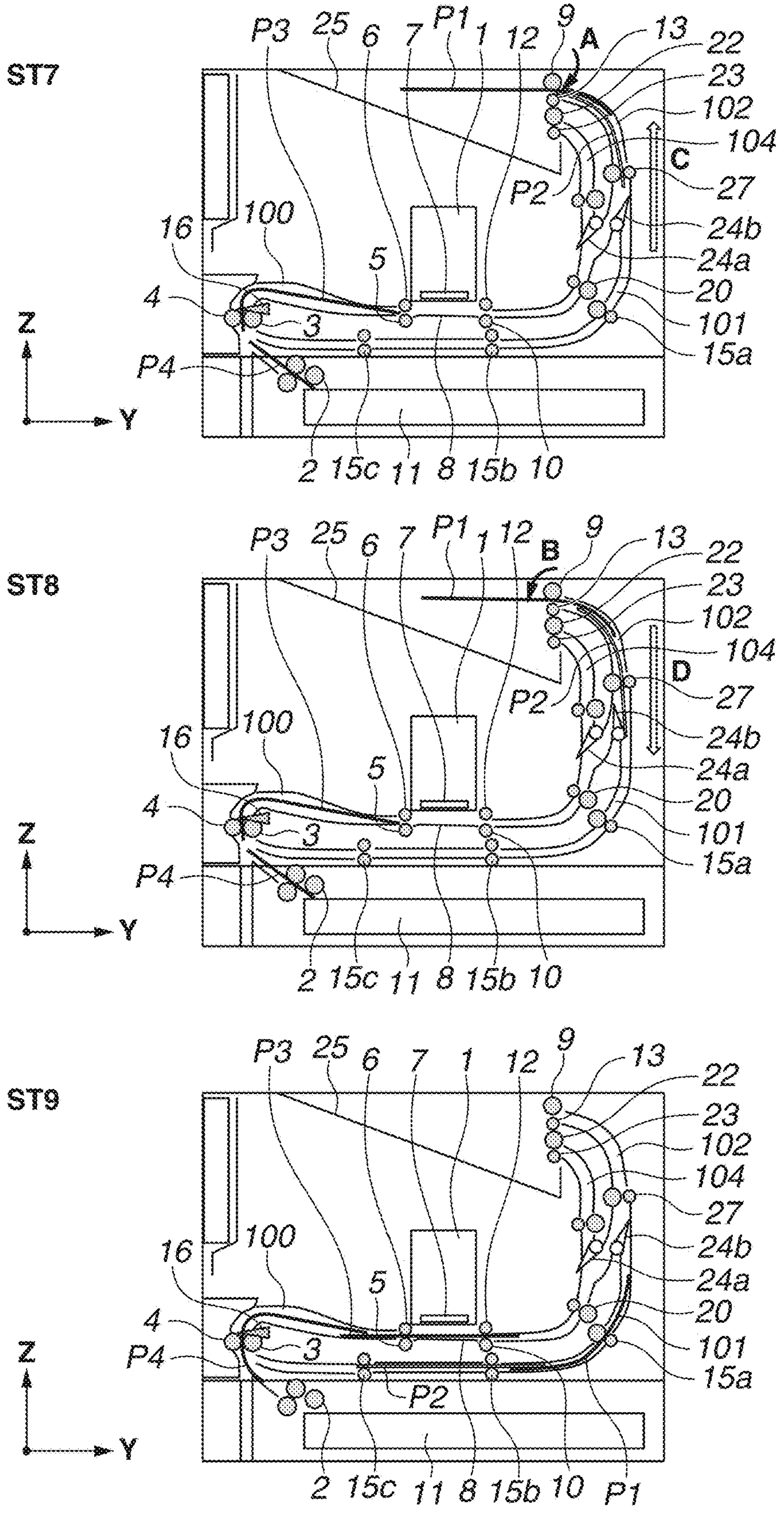
FIG. 10 is a view illustrating how the sheets P1 and P2 are conveyed through a reverse path and the sheets P3 and P4 are conveyed through a feed path.

FIG. 10 illustrates a state where the sheets P1 and P2 are conveyed through the reverse path 102 and the sheets P3 and P4 are conveyed through the feed path 100. As indicated by the state ST7, the control unit 201 conveys the sheets P1 and P2 to the reverse path 102 while maintaining the overlapping state of the sheet P1 and the leading edge of the sheet P2. At this time, the control unit 201 rotates the second reverse roller 27 and the reverse roller 9 in the forward direction (the direction A) and conveys the sheet P1 to a position where part of the sheet P1 is exposed from the recording apparatus 200. Further, the sheet P2 is conveyed by the second reverse roller 27 until the trailing edge of the sheet P2 passes the flapper 24*b*. Whether the sheet P2 has passed the flapper 24*b* is determined based on the amounts of rotation of the various rollers. In a case where the sensor 18 is provided, a result of detection by the sensor 18 can be used for the determination. Meanwhile, after feeding the sheet P3, the control unit 201 performs the pickup operation of the sheet P4 to be picked up fourth, with an interval between the sheets P3 and P4. Thereafter, the sheet P4 picked up by the pickup roller 2 is fed by the feed roller 3.

After the trailing edge of the sheet P2 passes the flapper 24*b*, the control unit 201 switches the flapper 24*b* to the first position. Thereafter, the control unit 201 rotates the second reverse roller 27 and the reverse roller 9 in the reverse direction (the direction B). Consequently, as indicated by the state ST8, the traveling direction of the sheets P1 and P2 is reversed from the direction C to the direction D while the overlapping state of the sheets P1 and P2 is maintained. Then, the sheets P1 and P2 are guided to the circulation path 101 along guides of the reverse path 102.

As indicated by the state ST9, after the traveling direction is reversed, the sheet P2 precedes the sheet P1 and is conveyed through the circulation path 101. At this time, the control unit 201 starts the recording operation on the sheet P3 based on the recording data corresponding to the back side of the fourth sheet. In this state, the control unit 201 performs the overlapping operation to overlap the leading edge of the sheet P4 on the sheet P3. More specifically, since the recording operation is being performed on the sheet P3 based on the recording data, the sheet P3 is conveyed intermittently by the first conveyance roller 5. Meanwhile, the sheet P4 is continuously conveyed at a conveyance speed of 20 inch/sec by the feed roller 3 after the leading edge of the sheet P4 is detected by the sensor 16, thereby reaching the sheet P3. Thereafter, the sheet P4 is fed by the feed roller 3 until the leading edge of the sheet P4 is stopped at a predetermined position upstream of the conveyance nip portion in the first conveyance direction. Since the conveyance speed of the sheet P4 is higher than the conveyance speed of the sheet P3 in the recording operation, the leading edge of the sheet P4 is overlapped on the sheet P3. In recording the last line on the sheet P3, the control unit 201 rotates the feed roller 3 by a predetermined amount in a state where the leading edge of the sheet P4 hits the conveyance nip portion. During the ejection operation by the recording head 7, the first conveyance roller 5 is stopped. Consequently, the sheet P4 becomes parallel to the first conveyance roller 5, and the skew of the sheet P2 is corrected.

Figure 11:
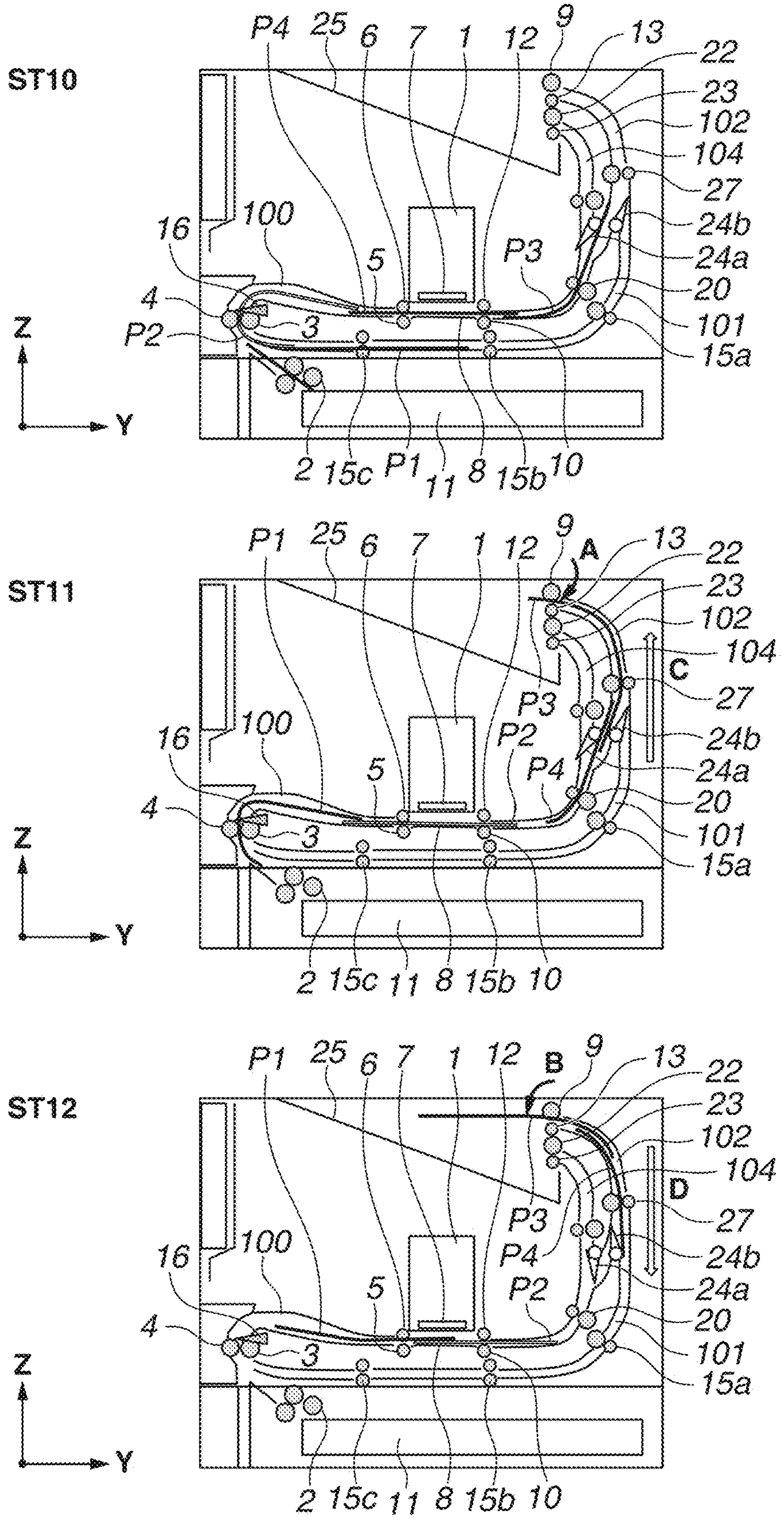
FIG. 11 is a view illustrating how the sheets P3 and P4 are conveyed through the reverse path and the sheets P2 and P1 are conveyed through the feed path.

FIG. 11 illustrates a state where the sheets P3 and P4 are conveyed through the reverse path 102 and the sheets P2 and P1 are conveyed through the feed path 100. In FIG. 11, the state changes to ST10, ST11, and ST12 in this order.

As indicated by the state ST10, to re-feed the sheet P2 to the recording head 7, the control unit 201 feeds the sheet P2 at high speed. Consequently, the leading edge of the sheet P2 is overlapped on the sheet P4 on which the recording is being performed by the recording head 7 based on the recording data corresponding to the back side of the third sheet. There may be a case where the sheet P2 is unable to be overlapped on the sheet P4, depending on the recording data. In this case, the control unit 201 does not perform control to overlap the sheet P2 on the sheet P4.

In a case where the sheet P2 is to be overlapped on the sheet P4, in recording the last line on the sheet P4, the control unit 201 rotates the feed roller 3 by a predetermined amount in a state where the leading edge of the sheet P2 hits the conveyance nip portion. While the ejection operation is performed by the recording head 7 during the intermittent conveyance, the first conveyance roller 5 is stopped. Consequently, the sheet P2 becomes parallel to the first conveyance roller 5, and the skew of the sheet P2 is corrected. The sheet P3 on which the recording is performed by the recording head 7 is conveyed to the reverse path 102 by the third conveyance roller 20 while the overlapping state with the sheet P4 is maintained. Following the conveyance of the sheet P3, the recording is performed on the sheet P4 by the recording head 7 based on the recording data corresponding to the back side of the third sheet. After completion of the recording on the sheet P4, the sheets P3 and P4 are conveyed to the reverse path 102. More specifically, the sheets P3 and P4 are conveyed to the reverse path 102 while the overlapping state of the sheets P3 and P4 is maintained. At this time, the overlapping state of the sheets P4 and P2 is canceled.

As indicated by the state ST11, after the recording is performed on the sheet P4, the control unit 201 re-feeds the sheet P2 to the recording head 7. The recording is performed on the sheet P2 by the recording head 7 based on the recording data corresponding to the front side of the first sheet. At this time, the control unit 201 rotates the third conveyance roller 20 and the first discharge roller 22 using the discharge motor 215 independently of the first conveyance roller 5 and the second conveyance roller 10. Consequently, the overlapping state of the sheets P4 and P2 is canceled. Thereafter, the control unit 201 rotates the second reverse roller 27 and the reverse roller 9 in the forward rotation (the direction A) to convey the sheet P3 in the direction C to expose part of the sheet P3 from the recording apparatus 200. Further, the control unit 201 conveys the sheet P4 by rotating the second reverse roller 27 in the forward direction until the trailing edge of the sheet P4 in the first conveyance direction passes the flapper 24*b*.

As indicated by the state ST12, after the recording is performed on the sheet P2, the control unit 201 re-feeds the sheet P1 to the recording head 7. The recording is performed on the sheet P1 by the recording head 7 based on the recording data corresponding to the front side of the second sheet. Meanwhile, after the trailing edge of the sheet P4 passes the flapper 24*b*, the control unit 201 switches the flapper 24*b* to the first position. Thereafter, the control unit 201 rotates the second reverse roller 27 and the reverse roller 9 in the reverse direction (the direction B). Consequently, the traveling direction of the sheets P3 and P4 is reversed while the overlapping state of the sheets P3 and P4 is maintained, and the sheets P3 and P4 are conveyed in the direction D toward the circulation path 101 through the reverse path 102 along the guides. There may be a case where the sheet P1 is unable to be overlapped on the sheet P2, depending on the recording data. In this case, the control unit 201 cancels the overlapping state of the sheets P2 and P1 and then performs the recording on the sheet P1.

Figure 12:
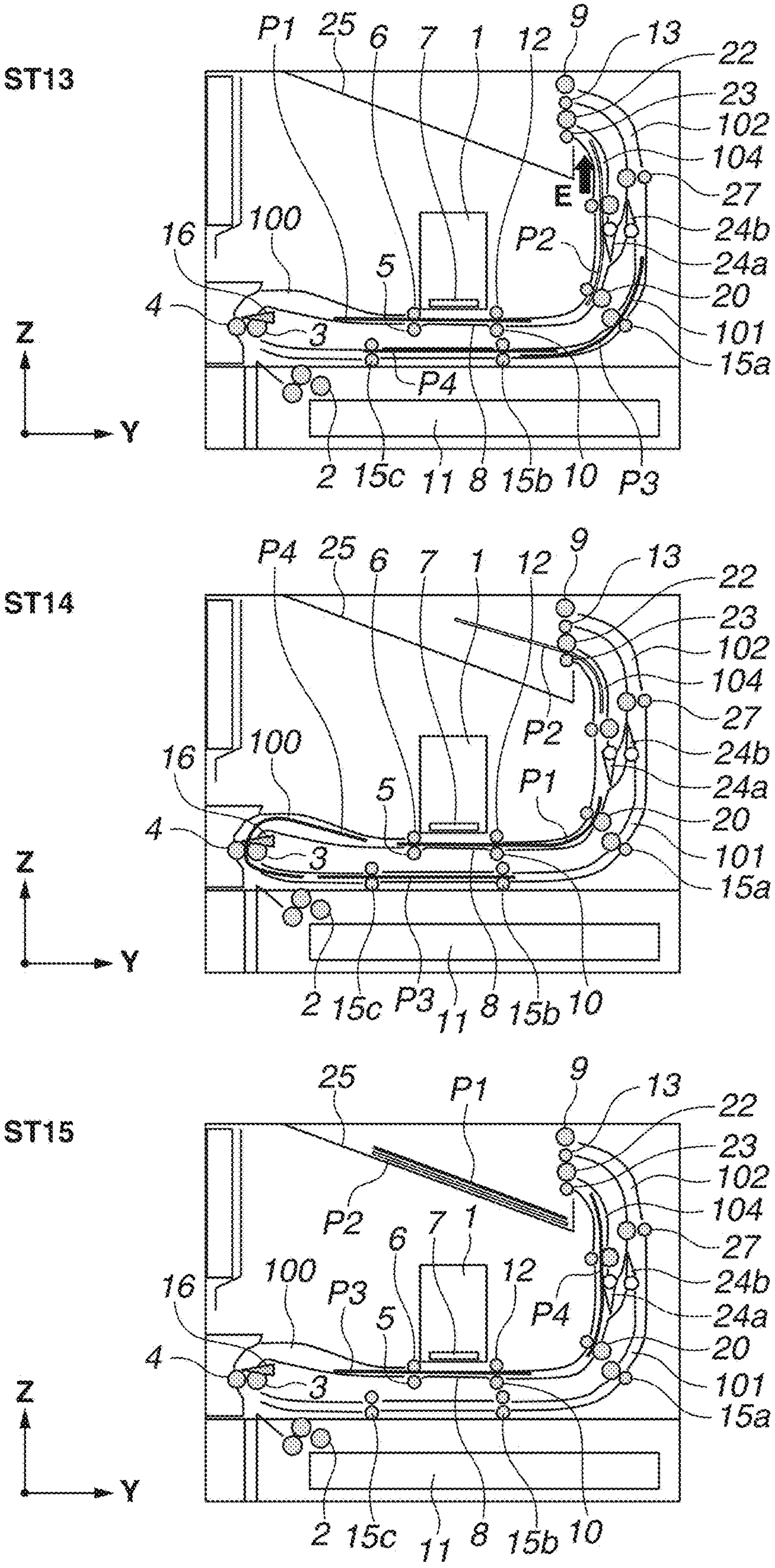
FIG. 12 is a view illustrating how the sheets P1 and P2 are conveyed through a discharge path and the sheets P3 and P4 are re-fed to the feed path.

FIG. 12 illustrates a state where the sheets P1 and P2 are conveyed through the discharge path 104 and the sheets P3 and P4 are re-fed to the feed path 100. The sheet conveyance path starting from the recording head 7 is branched to the discharge path 104 by the flapper 24*a*. The control unit 201 confirms that the trailing edge of the sheet P2 in the first conveyance direction has passed the second conveyance roller 10. Thereafter, as indicated by the state ST13, the control unit 201 rotates the third conveyance roller 20 and the first discharge roller 22 using the discharge motor 215 independently of the first conveyance roller 5 and the second conveyance roller 10. At this time, the preceding sheet P2 is conveyed by the third conveyance roller 20. Meanwhile, the recording is performed on the subsequent sheet P1 by the recording head 7. The control unit 201 controls the rotation speed of the third conveyance roller 20 so that an interval between the trailing edge of the sheet P2 and the leading edge of the sheet P1 becomes a predetermined distance or greater before the trailing edge of the sheet P2 passes the third conveyance roller 20. Consequently, the sheets P2 and P1 are separated from each other, and the overlapping state of the trailing edge of the sheet P2 and the leading edge of the sheet P1 in the first conveyance direction is canceled.

After the sheets P2 and P1 are separated from each other, in the state ST14, the sheet P2 is discharged to the discharge unit 25 by the first discharge roller 22. Meanwhile, the control unit 201 performs the recording operation on the sheet P1 based on the recording data corresponding to the front side of the second sheet. Thereafter, the control unit 201 performs the recording operation on the sheet P4 based on the recording data corresponding to the front side of the third sheet. The control unit 201 rotates the third conveyance roller 20 and the first discharge roller 22 using the discharge motor 215 independently of the first conveyance roller 5 and the second conveyance roller 10. Consequently, the sheet P2 is discharged to the discharge unit 25 in a state where the front side thereof faces downward. In some embodiment, the recording may be performed on the sheets P4 and P3 after the overlapping state of the sheets P4 and P3 is canceled by setting of different speeds for the feed roller 3 and the intermediate rollers 15*a*, 15*b*, and 15*c* based on the recording data. In this case, the sheets P4 and P3 are conveyed to the recording head 7 with an interval between the sheets P4 and P3 and are each discharged to the discharge unit 25 thereafter.

In the state ST15, the sheet P1 is discharged to the discharge unit 25 by the first discharge roller 22 in a state where the front side thereof faces downward. Meanwhile, the recording on the sheet P4 is ended, and the sheet P4 is conveyed by the third conveyance roller 20 and the first discharge roller 22. At this time, the control unit 201 performs the recording on the sheet P3 based on the recording data corresponding to the front side of the fourth sheet.

FIG. 13 illustrates a state where the sheets P1 to P4 are discharged. As indicated by the state ST16, the sheet P4 on which the recording is performed is discharged on the sheet P1 in the discharge unit 25 by the first discharge roller 22 while the front side thereof faces downward. Furthermore, as indicated by the state ST17, the sheet P3 is discharged on the sheet P4 in the discharge unit 25 by the first discharge roller 22 while the front side thereof faces downward. As described above, the double-sided data corresponding to the second sheet is recorded on the sheet P1 fed first. The double-sided data corresponding to the first sheet is recorded on the sheet P2 fed second. The double-sided data corresponding to the fourth sheet is recorded on the sheet P3 fed third. The double-sided data corresponding to the third sheet is recorded on the sheet P4 fed fourth. The sheets P2, P1, P4, and P3 are discharged in this order to the discharge unit 25.

The above-described exemplary embodiment provides a recording apparatus that improves productivity in double-sided recording on a plurality of sheets by reversing the traveling direction of a preceding sheet and a subsequent sheet and conveying the sheets through a reverse path while maintaining an overlapping state of the sheets.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-182933, filed Nov. 15, 2022, which is hereby incorporated by reference herein in its entirety.

What is claimed is:

1. A recording apparatus comprising:

a feed roller configured to feed a sheet;

a conveyance roller configured to convey the sheet fed by the feed roller;

a recording unit configured to perform recording on the sheet conveyed by the conveyance roller;

a reverse path configured to reverse, in the reverse path, a traveling direction of the sheet on which the recording is performed by the recording unit;

a circulation path through which the first sheet conveyed from the reverse path and the second sheet conveyed from the reverse path are to be returned to the recording unit; and a control unit configured to perform control so that a leading edge of a second sheet overlaps a first sheet on which recording is being performed by the recording unit, wherein recording on the second sheet is to be performed by the recording unit following the recording on the first sheet, wherein the control unit performs control to reverse the traveling direction of the first sheet and the traveling direction of the second sheet in the reverse path while maintaining an overlapping state of the first sheet and the second sheet, and wherein, after the recording is performed on the second sheet, the control unit is further configured to perform control to overlap the leading edge of the second sheet conveyed from the circulation path on a third sheet while the recording is being performed on the third sheet.

2. The recording apparatus according to claim 1, wherein the control unit is further configured to perform control to cancel, in the circulation path, the overlapping state of the first sheet on which the recording is performed by the recording unit and the second sheet on which the recording is performed by the recording unit.

3. The recording apparatus according to claim 1, wherein the third sheet is fed following the second sheet.

4. A recording apparatus comprising:

a feed roller configured to feed a sheet;

a conveyance roller configured to convey the sheet fed by the feed roller;

a recording unit configured to perform recording on the sheet conveyed by the conveyance roller;

a reverse path configured to reverse, in the reverse path, a traveling direction of the sheet on which the recording is performed by the recording unit;

a circulation path through which the first sheet conveyed from the reverse path and the second sheet conveyed from the reverse path are to be returned to the recording unit; and a control unit configured to perform control so that a leading edge of a second sheet overlaps a first sheet on which recording is being performed by the recording unit, wherein recording on the second sheet is to be performed by the recording unit following the recording on the first sheet, wherein the control unit performs control to reverse the traveling direction of the first sheet and the traveling direction of the second sheet in the reverse path while maintaining an overlapping state of the first sheet and the second sheet, and wherein the control unit performs control to convey the first sheet on which the recording is performed by the recording unit to the circulation path after conveying the second sheet on which the recording is performed by the recording unit to the circulation path.

5. The recording apparatus according to claim 4, wherein the feed roller is disposed on a feed path, and the circulation path is connected to the feed path.

6. The recording apparatus according to claim 4, further comprising a discharge path through which the first sheet on which the recording is performed by the recording unit and the second sheet on which the recording is performed by the recording unit are to be discharged, wherein the control unit is further configured to control performing the recording on the first sheet conveyed from the circulation path after performing the recording on the second sheet conveyed from the circulation path, and discharging the second sheet and the first sheet through the discharge path.

7. The recording apparatus according to claim 4, wherein the recording unit performs recording on a third sheet while the first sheet and the second sheet are being conveyed to the reverse path, wherein the third sheet is fed following the second sheet.

8. The recording apparatus according to claim 7, wherein, after the recording is performed on the third sheet, the control unit is further configured to control overlap of the leading edge of the second sheet conveyed from the circulation path on a fourth sheet while the recording is being performed on the fourth sheet, and wherein the fourth sheet is fed following the third sheet.

9. The recording apparatus according to claim 4, wherein, after the recording is performed on the second sheet, the control unit overlaps a leading edge of a fourth sheet on a third sheet while the recording is being performed on the third sheet, and wherein the recording on the fourth sheet is to be performed by the recording unit following the recording on the third sheet.

10. The recording apparatus according to claim 4, further comprising a stacking portion configured to stack the sheet so that a side of the sheet to be opposed to the recording unit faces downward.

11. The recording apparatus according to claim 10, wherein the recording unit includes a recording head configured to eject ink to the sheet.

12. The recording apparatus according to claim 11, wherein the control unit controls the recording by alternately causing the conveyance roller to perform a sheet conveyance operation and causing the recording head to perform an ink ejection operation.

13. A recording apparatus comprising:

a feed roller configured to feed a sheet;

a conveyance roller configured to convey the sheet fed by the feed roller;

a recording unit configured to perform recording on the sheet conveyed by the conveyance roller;

a reverse path configured to reverse, in the reverse path, a traveling direction of the sheet on which the recording is performed by the recording unit;

a circulation path through which the first sheet conveyed from the reverse path and the second sheet conveyed from the reverse path are to be returned to the recording unit; and a control unit configured to perform control so that a leading edge of a second sheet overlaps a first sheet on which recording is being performed by the recording unit, wherein recording on the second sheet is to be performed by the recording unit following the recording on the first sheet, wherein the control unit performs control to reverse the traveling direction of the first sheet and the traveling direction of the second sheet in the reverse path while maintaining an overlapping state of the first sheet and the second sheet, and wherein the control unit performs control to maintain the overlapping state of the first sheet and the second sheet in the circulation path.

14. The recording apparatus according to claim 13, further comprising a discharge path through which the first sheet on which the recording is performed by the recording unit and the second sheet on which the recording is performed by the recording unit are to be discharged.

15. The recording apparatus according to claim 14, wherein the control unit performs control to convey each of the first sheet and the second sheet to the discharge path without conveying the first sheet and the second sheet to the reverse path.

16. The recording apparatus according to claim 14, wherein the overlapping state of the first sheet and the second sheet is canceled in the discharge path after the recording is performed on both sides of each of the first sheet and the second sheet.

* * * * *